Aug. 1, 1950

C. W. MOTT 2,517,406

HYDRAULIC SYSTEM FOR PERIODIC TRANSMISSION OF
POWER FROM CONSTANT DELIVERY FLUID SERVICE

Filed Dec. 31, 1943

Inventor:
Carl W. Mott,
By Paul O. Pippel
Attorney.

Patented Aug. 1, 1950

2,517,406

UNITED STATES PATENT OFFICE 2,517,406

HYDRAULIC SYSTEM FOR PERIODIC TRANSMISSION OF POWER FROM CONSTANT DELIVERY FLUID SERVICE

Carl W. Mott, La Grange, Ill., assignor to International Harvester Company, a corporation of New Jersey Application December 31, 1943, Serial No. 516,468

16 Claims. (Cl. 60—52)

This invention relates to fluid-pressure regulation and control apparatus and has to do particularly with such an apparatus operable to effectuate and terminate delivery of fluid from a source to a place of discharge in accordance with the demand.

Apparatus constructed in accordance with the principles of this invention has special utility when interposed in the delivery line between a fluid-driven motor or the like and a constant delivery source of motor-propelling fluid, to establish a condition of high-pressure delivery between said source and motor during operating periods of the latter and to cause a low-pressure by-pass condition to prevail for the source during motor rest periods. The apparatus herein disclosed is an improvement upon that disclosed in my copending application, Serial No. 486,656, filed May 12, 1943 for Fuid Pressure Regulation and Control Apparatus, now Patent No. 2,420,554.

An important general object of the invention is the provision of pressure regulation and control apparatus employable in a circulatory system between a constant delivery source of motor-propelling fluid and a fluid-propelled motor in such a fashion that the source is caused to evenly supply the fluid to the motor at a desired high pressure, while the motor is connected to receive propelling fluid, irrespective of the rate of fluid demand or motor speed, and said apparatus being automatically operable to establish a by-pass channel in circuit with the source delivery upon the stopping of the motor, whereby the source can continue its delivery relatively effortlessly without heating the fluid.

Another object is the provision of a novel pressure regulator unit and manual supervisory control therefor associated for operation conjunctively with valve means for subjecting the motor to the propelling influence of the propelling fluid to manipulate the unit, for switching the fluid delivery to the motor when demanded and to by-pass when the motor is stopped.

Another object is the provision of a pressure regulator unit controllable to switch between adjustments of fluid delivery and fluid by-pass as aforesaid in response to a change of fluid pressure therein effected by the setting of a valve manipulatable coordinately with valve means which controls admittance of fluid into the motor. Thus the regulator unit is readily employable in installations requiring its disposal remotely from the motor and the control valves.

Another object is the provision of an improved pressure regulator unit employing a by-pass valve operating means operable to cause the by-pass valve to remain open in response to a moderate pressure as that at which fluid is by-passed through the unit, together with a control valve having a seatable member openable against the force of such nominal pressure to diminish the same for causing the operating means to cause closing of the by-pass valve. This arrangement is one in which the control valve is urged closed by a moderate pressure which is easily manually overcome to open such control valve and to thus close the by-pass valve to cause high-pressure delivery through the pressure regulator unit to the motor. Inexpensive, durable, non-leaking poppet valves are thereby usable for the by-pass and control valves in a system where it is essential that a mere "touch" force shall be sufficient to cause their operation.

Another object is the provision of a pressure regulator unit having the novel feature of a by-pass valve of the type seatable in the direction of by-pass flow to close, and unseatable against the pressure of pent-up fluid to open, together with means energizable by the such pressure to open said valve.

Another object is the provision of a pressure regulating system utilizable with a plurality of motors which may be selectively supplied with propelling fluid singly or in any concurrent combination, successively or collectively, while preserving the ease of manual manipulation for any succeedingly operated control valve by preventing unabated pressure thereon from the by-pass passage of the regulating unit in such system incident to the blocking of the common by-pass passage.

Another object is the provision, in a pressure regulation system between a constant fluid delivery pump and a fluid-driven motor, of valves physically associated with the motor to prevent the flow of fluid from both its inlet and outlet whereby the motor work member is retained by locked fluid from drift in either direction, without constant pressure and deterioration strain within an intervening fluid delivery conduit such as rubber and fabric hose.

These and other desirable objects inherent to and encompassed by the invention will be more fully understood after reading the ensuing description with reference to the annexed drawings, wherein.

Figure 1:
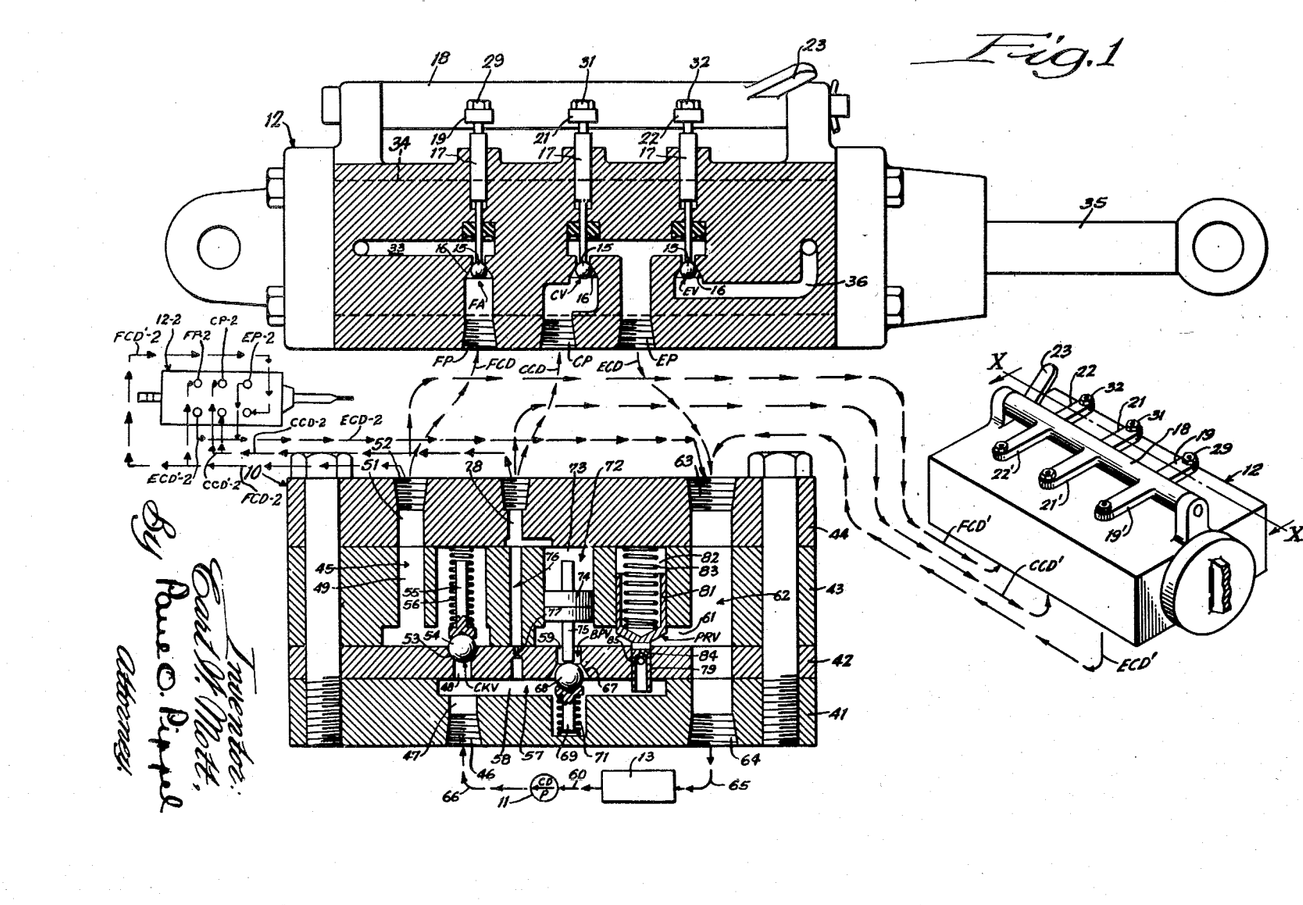
Fig. 1 is a partial diagrammatic sectional view illustrating the fluid passages and valve arrangement within a pressure-regulating device and within a side wall of a fluid-driven motor, illustrating a preferred form of apparatus constructed according to the principles of the present invention.

That form of the invention shown in Fig. 1 includes pressure-regulating apparatus in which there is a pressure-regulating unit 10 for controlling the flow of fluid from a constant delivery source or pump 11, shown schematically, to a reciprocating type of motor 12 or alternatively to a reservoir 13 for recirculating through the pump at low pressure. In addition to the pressure-regulating unit proper which is designated 10, the pressure-regulating apparatus includes certain valves which are disposed remotely from said unit and in the present installation are incorporated into the casing structure of the motor 12. These valves are in two sets of three, one set of valves being upon each side of the motor. Each set of valves, of which one is shown in the upper part of the figure, includes a normally closed fluid-admittance valve FA, a control valve CV, and an exhaust valve EV. Each valve includes a ball 15 normally held upon a seat 16 by means of a spring, not shown. These balls are unseatable against the force of their respective springs (not shown) and against the force of a slight fluid pressure, presently to be explained, by means of associated reciprocal valve-operating stems 17.

A pivotable valve-operating member 18 has two sets of tappet arms, or which the set for operating the valve stems 17, shown in the upper part of Fig. 1, consists of arms 19, 21, and 22. The other set of tappet arms, which respectively correspond to the arms 19, 21, and 22, are indicated by the numerals 19', 21', and 22' in the right-hand portion of Fig. 1, which consists of a perspective view of the motor with the side nearer to the observer which is opposite to the observer as the motor is illustrated in the upper part of Fig. 1. Proper orientation of the two views of the motor shown in the upper part of the figure and in the right-hand part of the figure, will be assisted by reference to the line X—X in the right-hand part which indicates a plane upon which the section shown in the upper part is taken. A lever 23 projecting from one side of the pivotable control member 18 is provided for the application of pivotable force to said member, and threaded tappet members 29, 31, and 32 are provided in the ends of the tappet arms 19, 21, 22 for engaging the upper ends of the valve stems 17. When the operating lever 23 is pressed downwardly, the lower ends of the threaded tappet members 29, 31, 32 will abut against the upper ends of said valve stems for depressing the same and concurrently unseating the valve balls 15 of the valves FA, CV, and EV. This operation is for permitting the entrance of fluid under pressure through a port FP past the valve FA and through a channel 33 into the left end of the motor cylinder 34, as viewed in the upper part of Fig. 1, for moving a piston (not shown) and the piston rod 35 connected to such piston to the right. Pursuant to the movement of said piston to the right, it causes the exhaust of fluid from the right end of the cylinder through an exhaust passage 36 upwardly past the valve EV and outwardly of the motor casing through a port EP. The control valve CV is for controlling the setting of the pressure-regulating unit 10 in a manner hereinafter described, wherefore, upon the opening of said valve CV, said unit will be changed from a by-pass condition in which fluid is circulated at low pressure between the pump outlet, the reservoir, and the pump inlet to a condition in which the fluid is discharged from said unit at high pressure to the fluid-admittance port FP of the motor.

When the control lever 23 is lifted, the tappet members 29, 31, and 32 are lifted from the upper ends of the valve stems 17 to permit closing of the valves FA, CV, and EV. Upward movement of the lever 23 past the neutral position illustrated in Fig. 1 will cause the tappet members 29, 31, and 32 to be raised or separated from the upper ends of their associated valve stems, while tappet members, not shown, in the arms 19', 21', and 22' will be effective for depressing valve stems for operating valves respectively corresponding to the valves FA, CV, and EV, which cause fluid to be introduced into the right end of the cylinder 34 for moving the piston and its rod 35 to the left while expelling fluid from the left end of the cylinder through a passage, not shown, corresponding to the exhaust passage 36. The diagrammatically represented conduits FCD, CCD, and ECD, which respectively communicate with the ports FP, CP, and EP, are duplicated by conduits FCD', CCD', and ECD', which communicate in the same manner with ports corresponding to the ports FP, CP, and EP, which are employed when the piston is to be moved to the left as aforesaid.

The pressure regulating unit 10 in the first embodiment comprises a laminated casing consisting of a lower plate 41, a valve seat plate 42, an intermediate plate 43, and a crown plate 44. A fluid delivery passage 45 for communication between the discharge section of the pump 11 and the motor, includes a port 46 in the plate 41, a fluid delivery passage portion 47 in said plate, a portion 48 in the plate 42, portions 49 and 51 in the plates 43 and 44, and a port 52 in the plate 44 for the connection of the conduits FCD and FCD'. In a generic sense, when considering the apparatus as a whole, these conduits FCD and FCD', as well as the ports as FP and the channels as 33 constitute portions of the fluid delivery passage. A check-valve CKV for the fluid delivery passage 45 consists of a valve seat 53, a ball 54, a ball follower 55, and a spring 56, which compresses the follower against the ball for urging the latter upon the seat.

A by-pass passage 57 includes a channel 58 in the upper face of the plate 41, a hole 59 through the plate 42, and a channel 61 in the lower face of the plate 43. This channel 61 communicates with a fluid return passage 62, which is made up of holes vertically alined in the plate 41—44, there being threaded ports 63 and 64 at the ends of this fluid return passage. Here again the fluid return passage in a broader aspect is regardable as including the exhaust passages as 36 in the motor casing, the ports as EP in such casing, the conduits ECD and ECD', and a conduit 65 connecting the port 64 with the reservoir 13. Since the fluid returned through the fluid return passage 62 into the reservoir 13 is simply stored in this reservoir preparatory to being again discharged through the pump 11, the pump and reservoir may be logically regarded as the constant delivery source, that part of the reservoir into which the conduit 65 discharges, regarded as the fluid-receiving section of such source, and the fluid discharge section from which the conduit 66 leads from the pump 11, regarded as the fluid discharge section of such source. A by-pass valve BPV controls the passage of fluid through the by-pass passage 57, the valve comprising a seat 67 in the passage portion 59, a ball 68, a ball follower 69, and a spring 71 for urging the follower against the ball for tending to press the latter in closing seating relation on the seat 67.

Pressure-responsive valve-controlling means 72 for controlling the open and closed position of the by-pass valve BPV includes a chamber 73 in the plate 43. This chamber 73 is cylindrical and contains a piston 74, which carries a valve stem 75 abuttable against the ball 68 for pressing the ball into the open position shown when the pressure in the chamber 73 above the piston 74 sufficiently exceeds the pressure in that part of the chamber below the piston.

Fluid pressure for forcing the piston 74 downwardly is obtained through a pressure transfer passage 76 which communicates with the constant delivery source through a small diameter section 77 of restricted flow capacity, a part of the by-pass passage, the port 46, and the conduit 66. A control passage 78 communicates with the chamber 73 and with the transfer passage 76 for withdrawing fluid from this chamber and passage to diminish the pressure in the chamber 73 to permit the raising of the piston 74 and the closing of the by-pass valve BPV when it is desired to establish the high-pressure condition in the apparatus. Normally, fluid will be trapped within the chamber 73 by the normally closed control valve CV upon the motor casing. When the valve CV is open, as explained hereinabove, fluid escapes from the chamber 73 and the transfer passage 76 through the control passage 78 and the conduit CCD, which comprises a part of said passage, past the valve CV, through the port EP into the fluid return passage 62, and back to the constant delivery source. It will be seen that when the valves FA and EV, for respectively admitting fluid to one end of the cylinder 34 and exhausting it from the opposite end of the cylinder, are open, the control valve CV, which is concurrently open, will cause the pressure-responsive valve-controlling means 72 to function for causing closing of the by-pass valve BPV so that high pressure will be built up in the fluid delivery passage 45 for delivery of fluid at a sufficiently high pressure for moving the piston against the resistance of a substantial load.

A pressure-relief valve PRV for preventing the building up of excessive pressure in the fluid delivery passage, is operable to control the escape of fluid through the by-pass passage 57 and outwardly through a hole 79 in the plate 42 to the fluid return passage 62. This pressure relief valve comprises an enlarged cylindrical spring-receiving cup 81 slidable within a recess 82 formed by a hole in the plate 43 and the under face of the crown plate 44. A spring 83 compressed between the bottom of the spring-receiving portion 81 and the under face of the plate 44, constantly urges a small diameter portion 84 depending from the portion 81 downwardly in the hole 79. Upon the development of a predetermined maximum pressure within the fluid delivery passage and hence in the by-pass passage 57 for reacting upwardly upon the small diameter portion 84, this portion will be forced upwardly against the opposition of the spring 83, whereby holes 85 in the portion 84 will be elevated above the upper face of the plate 42 to provide communication between the by-pass passage and the fluid return passage.

Operation of the apparatus

The apparatus is illustrated in Fig. 1 in the by-pass condition with the motor at rest. While this condition prevails, the piston (not shown) will be locked against axial movement within the cylinder 34, since fluid upon the right end of the piston cannot escape past the exhaust valve EV, and fluid upon the left end of the piston cannot escape past the check-valve CKV. Fluid delivered into the unit 10 through the port 46, fills the transfer passage 76, the chamber 73, and the control passage 78 because of the control valve CV being closed, and sufficient pressure is applied through this fluid in the chamber 73 for forcing the piston 74 downwardly to maintain the by-pass valve ball 68 in the unseated position illustrated. It was explained above that the piston of the motor 12 is locked against axial movement because of the function of the check-valve CKV and the exhaust valve EV, preventing escape of fluid from the two ends of the cylinder 34. It should be explained that through the conduit FCD', the check-valve CKV also operates complementally with the exhaust valve EV in preventing the escape of fluid from the right end of the motor cylinder as this cylinder is oriented in the upper part of Fig. 1, and that the valve corresponding to the valve EV on the opposite side of the cylinder to that viewed in Fig. 1, operates complementally with the check-valve CKV for preventing the escape of fluid from the left end of the cylinder.

Assuming it is desired to cause the motor piston to be moved to the right as viewed in Fig. 1, the valve operating means or member 18 will be pivoted for lowering the outer ends of the tappet arms 19, 21, and 22 to cause concurrent opening of the valves FA, CV, and EV. This opening of the control valve CV will divert fluid from the pressure transfer passage 76 and from the valve-controlling means chamber 73 into the fluid return passage 62 more rapidly than fluid can be replaced through the restricted opening 77, since the flow capacity of the control passage past the valve CV exceeds the flow capacity of the restricted passage portion 77. In this manner the pressure of fluid in the chamber 73 of the valve controlling means 72 is changed from an upper proportional value of fluid pressure in the delivery passage portion 48 to a pressure of lower proportional value of that in such delivery passage portion. The reduction in pressure within the chamber 73 occurs quickly so that the combined effort of the by-pass valve spring 71 and the pressure of fluid within the by-pass passage below the ball 68 is effective for seating this ball and terminating the escape of fluid through the by-pass passage. Fluid from the constant delivery source thereupon instantaneously builds up pressure within the by-pass passage below the ball 68 and within that portion of the fluid delivery passage below the check-valve CKV sufficiently to unseat the check-valve ball and force fluid upwardly through the fluid delivery passage past the fluid-admittance valve FA, now open, and into the left end of the cylinder 34. Movement of the motor piston to the right, under the force of the fluid thus delivered into the left end of the cylinder 34, is permitted by the opened exhaust valve EV, which permits the escape of fluid from the right end of the cylinder into the fluid return passage 62.

When the motor has been operated for the length of time causing movement of the motor piston to the desired position, stopping of the motor is brought about instantaneously by pivoting the control member 18 in the direction for raising the tappet arms 19, 21, and 22, thereby causing the valves FA, CV, and EV to close. This closing of the valve FA prevents further delivery of propelling fluid into the left end of the cylinder, while such closing of the exhaust valve EV prevents further escape of fluid from the right end of the cylinder, causing the piston to be locked in the position at which it has come to rest. Closing of the control valve CV prevents further escape of fluid from the pressure transfer passage 76 and the valve-controlling means chamber 73, wherefore fluid forced into the chamber 73 through the pressure transfer passage, attains sufficient pressure for forcing the piston 74 downwardly for opening the by-pass valve. The by-pass status illustrated in Fig. 1 is thereby reestablished so that during the rest period of the motor 12, fluid can by-pass through the by-pass passage of the unit 10 from the fluid discharge section of the constant delivery source to the fluid-receiving section of such source. This low pressure by-pass will occur without materially heating the fluid and without consuming significant power.

While the valve control member 18 is pivoted for unseating the valves FA, CV, and EV to cause the high-pressure delivery of fluid for advancing the motor piston to the right, the speed at which the piston is caused to move may be selected by controlling the pivoted position of the member 18 and thereby the distance the ball 15 of the valve FA is lifted from its seat 16. By thus throttling or controlling the flow capacity past the fluid-admittance valve FA, the flow rate into the cylinder may be selectively controlled without diminishing the force with which the piston is advanced, since the fluid delivered past the fluid-admittance valve will be at a high pressure. During such a period when the admittance of fluid into the motor is at a rate less than the delivery rate of the constant delivery source, the pressure will be built up in the fluid delivery passage below the fluid-admittance valve FA and also within that part of the by-pass passage below the by-pass valve 68 to a predetermined maximum at which the pressure relief valve PRV will be operated by this pressure for establishing communication through the ports 85 of the pressure relief valve from the by-pass passage to the fluid return passage. Therefore, periodically and for short intervals the pressure relief valve PRV will serve as a by-pass valve permitting the constant delivery source to operate under a high-pressure by-pass condition. However, the periods of this type of operating condition are short and infrequent, that is, only during periods when the motor 12 is operated slowly.

The pressure relief valve PRV, in addition to serving as a by-pass valve during slow operation of the motor as aforesaid, further serves as a safety device for preventing the attainment of undesirable high pressures at any time. For example, in the sequence of events occurring when the motor is brought to rest by the closing of the valves FA, CV, and EV, should the pressure in the fluid delivery passage 45 and that part of the by-pass passage 57 beneath the ball 68 have a tendency to build excessively before the pressure of fluid within the valve-controlling means chamber 73 can build up sufficiently in pressure to force the piston 74 and the ball 68 downwardly for opening the by-pass valve, this interim will incur no danger because of the presence of the pressure relief valve. Thus this pressure relief valve makes it possible for the tappet member 31 to be set for the control valve CV to open before the valves FA and EV (though it would close last in the stopping of the motor) so the motor operation response to manual control will be fast, because the regulating unit will then start functioning to terminate the by-pass condition by the time the valves FA and EV are open. Normally, however, the control valve CV will open slightly after the admittance valve FA so that CV will close slightly prior to FA upon the stopping of the motor, whereby motor-driven means shown in my copending application, Serial No. 516,471, filed December 31, 1943 for Fluid Control for Fluid-Driven Motor, now Patent No. 2,399,756, will be assured of power from the motor for being driven far enough to cause the valve CV to be closed.

The above description of the operation is confined to the parts which are affected when the control member 18 is pivoted in the direction for manipulating the valves FA, CV, and EV. The same operations occur when the member 18 is pivoted in the opposite direction for operating the other set of valves corresponding to the valves FA, CV, and EV, the only difference being that fluid is admitted to and withdrawn from respective opposite ends of the cylinder 34 to cause movement of the piston in the opposite direction.

In the lefthand part of Fig. 1 a second fluid motor 12—2 is shown connected with the pressure-regulating unit 10. This member 12—2 is like the motor 12 but is rotated 90° about its principal axis with respect to the position of the motor 12 so as to expose all six ports in the bottom of its casing or cylinder. The ports of this second motor 12—2 and the conduits connected therewith are designated by the same respective reference characters as the corresponding ports and conduits of the first motor but with the addition of the suffix digit "2." Additional motors could be connected with the pressure-regulating unit in parallel with the motors 12 and 12—2. It is possible to control any number of motors from said unit and to cause these motors to be driven singly or in any combination, and to cause them to be started and stopped in concert or in any desired sequence singly or in groups. When the control valve CV of any of these motors is open, the by-pass valve of the pressure-regulating unit will be closed to condition this unit for cooperation with the constant delivery source for providing fluid at high pressure for delivery to any of these motors upon the opening of their fluid-admittance valve. Although the valve balls of the valves FA, CV, and EV are opened against pressure, this pressure will be a nominal pressure so that the manual operation of the valve control member 18 will be substantially effortless. Unseating of the ball of the valve EV is not difficult, because the fluid at the ends of the motor piston is under no forced pressure when the motor is at rest. The pressure will be equal upon both sides of the ball of the valve FA, wherefore no substantial resistance is encountered upon unseating of this ball. While there will be a slight pressure on the under side of the control valve ball, this pressure will not be of a significant magnitude, because it will not exceed the pressure at which the fluid is by-passed from the source through the by-pass passage 57. When a plurality of motors is connected to the common pressure-regulating unit 10 and one or more of the motors is in operation when another of the motors is to be started, the fact that there will be, at this time, a high pressure in the by-pass passage 57 beneath the ball 68 will not cause a significantly high pressure to be transmitted to the control valve of said other motor, because the control valves CV of the operating motors will have a flow capacity exceeding that of the restricted passage portion 77. Thus, though there is, at this time, a high-pressure condition in the fluid delivery and by-pass passages of the pressure control unit, this pressure cannot be imposed through the restricted passage portion 77 onto the under side of the ball of the control valve CV of a subsequently operated motor with sufficient force to significantly increase its resistance to manual opening.

Figure 2:
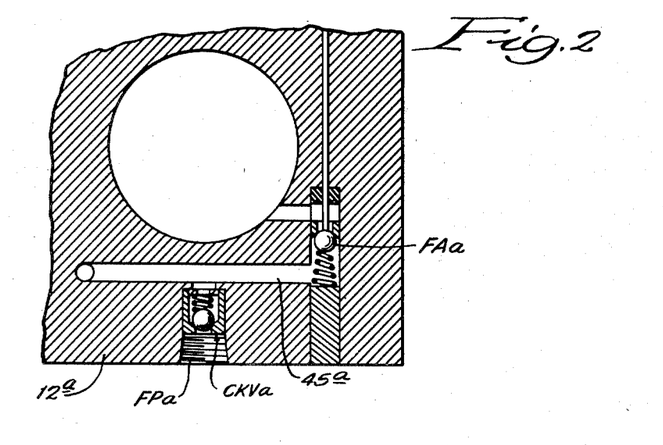
Fig. 2 is a fragmentary, partially schematic, sectional view illustrating a modified arrangement of the apparatus, wherein a check-valve for preventing reverse flow of the fluid in the fluid delivery passage to the motor is contained within a side wall of the motor.
Figure 3:
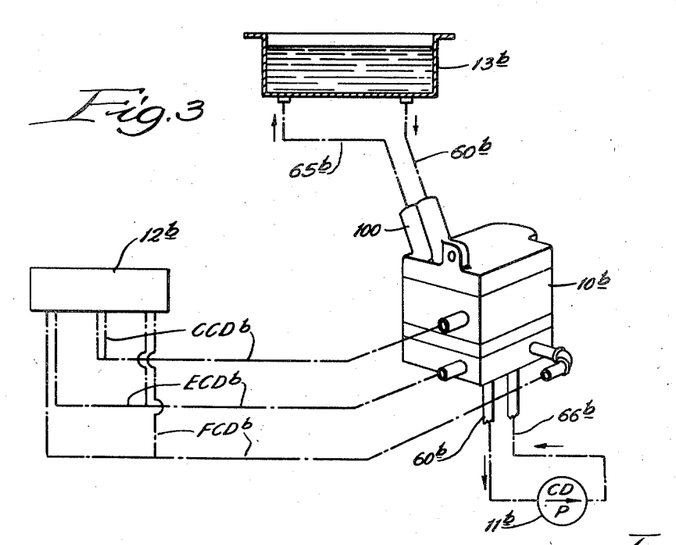
Fig. 3 is a perspective view of a modified form of pressure-regulating unit embodying the principles of the regulating unit shown in Fig. 1, together with schematic representations of a constant delivery pump, a motor, and a reservoir and the conduits of a circulatory system interconnecting the unit with these parts.

In a modified control arrangement, the check-valve CKV is removed from the pressure-regulating unit 10 and installed in that part of the fluid delivery passage within a central bottom part of the motor casing. An arrangement of this kind is shown in Fig. 2 where the check-valve is designated CKV$^a$. One section of the fluid delivery passage 45$^a$ leads to the fluid-admittance valve FA$^a$, which corresponds to the valve FA in Fig. 1, and a left-hand section of the passage 45$^a$ leads through the motor casing to the valve corresponding to the valve FA'a upon the opposite side of the motor cylinder. The port FP$^a$ in the motor 12$^a$ corresponds to the port FP in the motor 12. When this arrangement is used, no fluid under high pressure is trapped in the hose or other conduits between a check-valve in the pressure-regulating unit and the motor subsequent to stopping of the motor, while a load force is being imposed upon its piston in a manner tending to compress the fluid which had advanced the load.

Second embodiment—Figs. 3 to 9

The second embodiment of the invention, illustrated in Figs. 3 to 9, operates upon the same principles as the first embodiment above described and employs respectively corresponding elements, which, to expedite this description, are designated by the same reference characters with the addition of the letter b.

While the same elements are employed in the second embodiment as in the first embodiment, those elements are in a different geometric relation. For instance, in comparing Figs. 1 and 3, it can be readily seen that the reservoir 13$^b$ and the pump 11$^b$, instead of being connected by a single conduit element 60, are connected by a passage 60$^b$, which includes one passage within a multiple passage conduit 100, a plurality of vertically alined holes within the casing plates 41$^b$ to 44$^b$, as viewed in Fig. 7, and a pipe which extends such passage 60$^b$ from the unit 10$^b$ to the inlet side of the pump 11$^b$. The outlet side of the pump 11$^b$ is connected with the pressure regulating unit 10$^b$ through a conduit 66$^b$ corresponding to the conduit 66 in Fig. 1. A second passage within the multiple passage conduit 100 provides the passage 62$^b$ for connecting the inlet side of the reservoir with the unit 10$^b$. Although the reservoir 13$^b$ and the pump 11$^b$ are more remotely related in a physical sense in the second embodiment than in the first embodiment, since these elements 13$^b$ and 11$^b$ are communicative through the passage 60$^b$, these elements can still be regarded as counterparts of a constant delivery source, with the inlet to the reservoir constituting the fluid-receiving section of said source and the outlet of the pump constituting the fluid discharge section of said source. The connections of the fluid delivery passage FCDb and FCD'b between the pressure regulating unit 10$^b$ and the motor 12$^b$ are the same as in the first embodiment as can be determined by an examination of Fig. 3. Likewise, the connections of the exhaust passage sections ECDb and ECD'b and of the control passage sections CCDb and CCD'b, between said unit 10$^b$ and the motor 12$^b$, are the same as in the first embodiment. It is believed a thorough understanding of the arrangement of the parts of this second embodiment and their functions will be gained by a description of their operation without additional preliminary reference and to their geometric locations in the apparatus.

Operation of the second embodiment

The various parts are illustrated in the drawings in the positions occupied while the apparatus is operating to deliver fluid at high pressure from the constant delivery source to the motor 12$^b$. This phase in the operating cycle of the apparatus is ascertainable by reference to the by-pass valve BPVb in Figs. 4, 5, and 9, where it can be seen that this valve is closed. This further signifies that one set of the motor valves, corresponding to the valves FA, CA, and EV in Fig. 1, is open. Fluid from the constant delivery source, therefore, flows inwardly of the pressure regulating unit 10 through the conduit 66$^b$, Figs. 3, 4, and 7. Arrows are employed in many of the passages to indicate the paths and direction of flow. In some instances, arrow points and arrow tails, respectively signified by a point in a circle and a cross in a circle, are used to indicate flow toward and away from the observer. For example, in Fig. 4, the small dotted circle 101 with the point therein signifies that fluid is flowing upwardly through the circular passage 66$^b$ toward the observer, whereas the cross in the circle 102, in the right-hand part of Fig. 4, signifies that the fluid is flowing downwardly in the circular vertical portion of the passage 60$^b$. In instances where the small arrow-signifying circles consists of dot-dash lines, as in that circle 103 shown in that part of the passage at 45$^b$ in Fig. 9, fluid has entered that portion of the passage shown from a part of that passage nearer to the observer than to the part shown in the drawings. The fluid continues upwardly in the fluid delivery passage 45$^b$ through that portion of the passage in the lower plate 41$^b$, Fig. 7, in that portion of the passage 45$^b$ formed in the upper face of the plate 41$^b$, Fig. 6, upwardly past the check-valve CKVb, Fig. 6, through those portions of the fluid delivery passage 45$^b$ in the plates 43$^b$, 42$^b$, and 41$^b$, Fig. 6, and thence through the conduit FCD$^b$, Fig. 3, to the left end of the cylinder in the motor 12$^b$. Simultaneously, with the movement of the motor piston, not shown, in said motor to the right, fluid is expelled from the right end of the motor cylinder, past the valve, not shown, corresponding to the valve EV, shown in Fig. 1, thence through the exhaust conduit ECDb and into the pressure-regulating unit through the ports 63b, Fig. 4, and continue through the unit 10b by successively traversing those portions of the fluid-return passage 62b in the lower plate 41b, the valve seat plate 42b, the underside of the intermediate plate 43b, upwardly through the plate 43b, and through one of the channels in the multiple channel duct to the reservoir, see Figs. 5 and 3. From the reservoir the fluid is delivered to the pump 11b through the hereinabove traced fluid supply passage designated at 60b and plainly illustrated in Figs. 5, 7, and 3.

Figure 4:
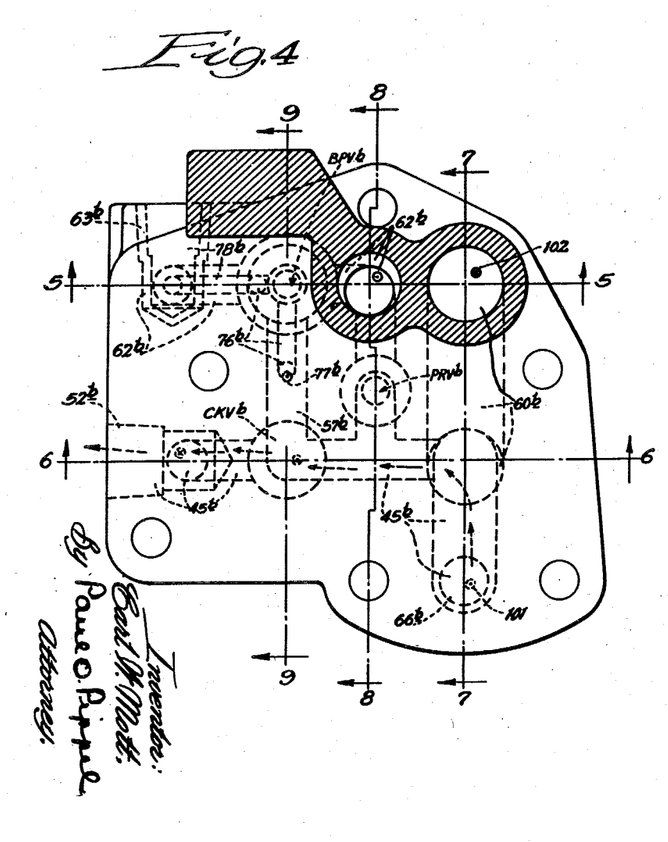
Fig. 4 is a plan view of the pressure-regulating unit shown in Fig. 3 and taken on line 4—4 of Fig. 5.
Figure 5:
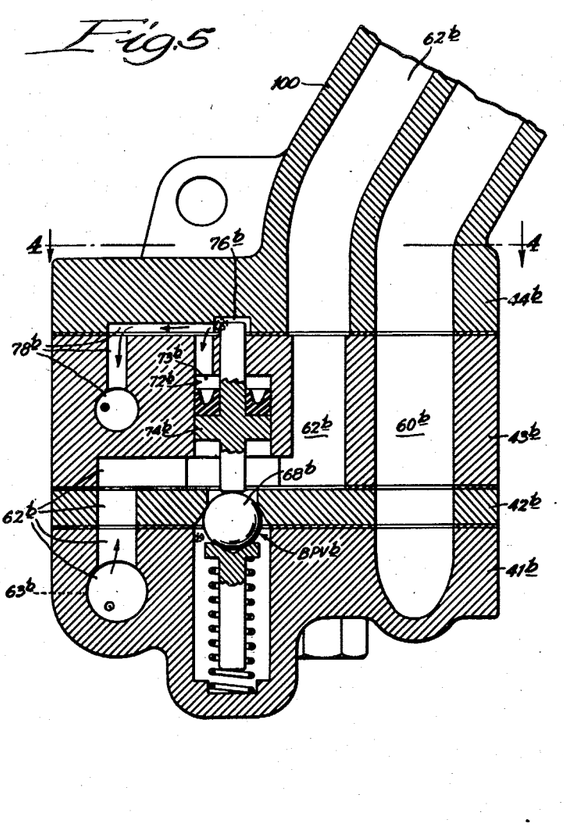
Fig. 5 is a vertical sectional view taken through the pressure-regulating unit at the plane indicated by the line 5—5 of Fig. 4.
Figure 6:
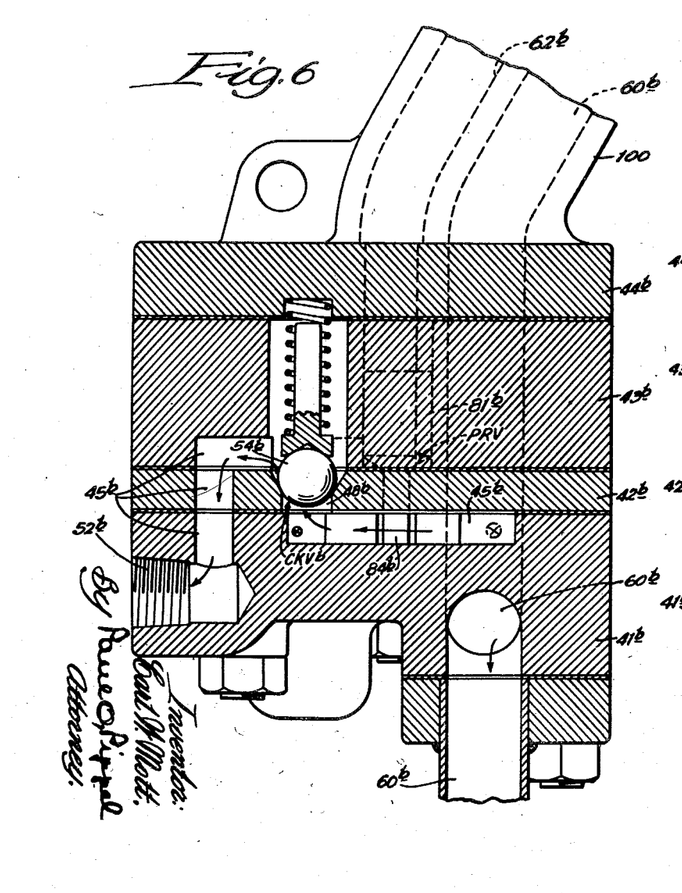
Figs. 6, 7, 8, and 9 are vertical sectional views taken at the planes respectively indicated by the lines 6—6, 7—7, 8—8, and 9—9 in Fig. 4.
Figure 7:
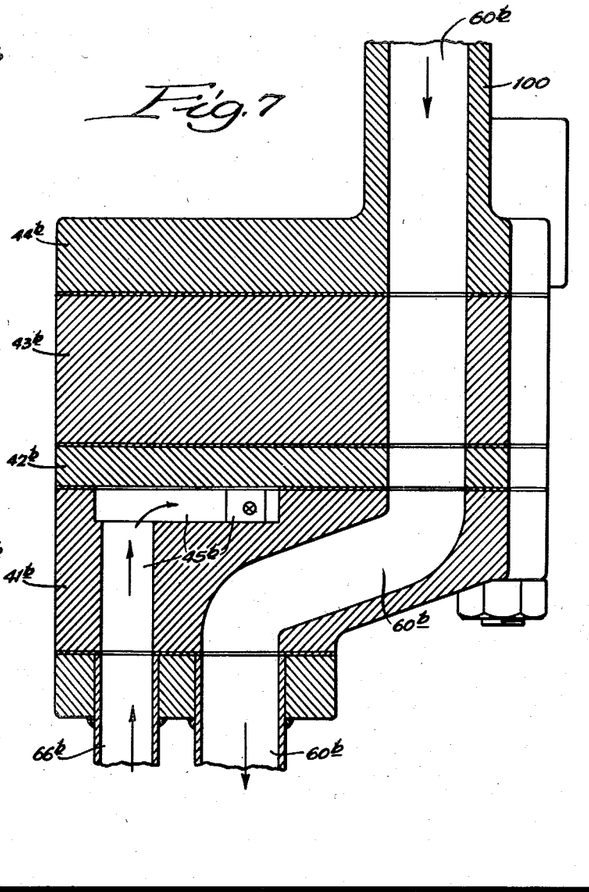
Figure 9:
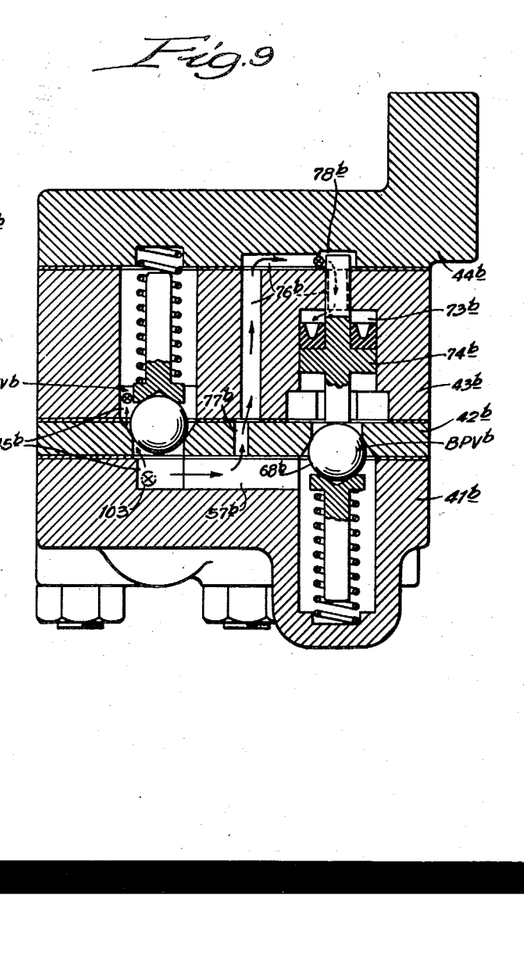

The by-pass passage 57b joins or branches from the fluid delivery passage 45b at the point visible in Figs. 4 and 9. Since the by-pass valve ball 68b, Fig. 9, is seated, fluid from the passage 57b will be forced upwardly through the restricted hole 77b in the valve seat plate 42b and thence through the transfer passage 76b into the chamber 73b for the piston 74b of the controlling means for the by-pass valve. However, this pressure will be insufficient to force the piston 74b downwardly for unseating the valve 68b because of the control valve CV (not shown) associated with the motor being open at this time. Because of this control valve CV being open, fluid is diverted or withdrawn from that part of the transfer passage 76b in the lower face of the casing crown plate 44b, Figs. 9 and 5, through those portions of the control passage 78b respectively in the lower face of said crown plate 44b and in the intermediate plate 43b. From the horizontal portion of the control passage 78b in the intermediate plate 43b, Figs. 4, 5, and 3, the fluid escapes through the conduit CCDb, the control valve CV in the motor, and thence through the exhaust conduit ECDb and that portion of the fluid return passage 62b in the unit 10b and through the portion of the fluid return passage 62b in a multiduct conduit 100 to the reservoir 13b. The path taken by the fluid return passage 62b through the unit 10b is clearly shown in Figure 5. When the motor has operated the desired amount, the valves FA, CA, and EV thereof will be closed with the same effect as described in connection with the first embodiment, namely, to prevent escape through the control valve CV of fluid through the control passage 78b, Figs. 5 and 9, from the fluid transfer passage 76b and the valve control means chamber 73b, Fig. 9, wherefore fluid from the source by way of the fluid delivery passage 45b and that portion of the by-pass passage 57b in the upper face of the lower casing plate 41b, Fig. 9, will be impressed through the restricted opening 77b and the transfer passage 76b for applying sufficient downward pressure in the chamber 73b upon the piston 74b for opening the by-pass valve and permitting the escape or by-pass of fluid from the discharge section of the constant delivery source upwardly past the by-pass ball valve 68b, Fig. 5, into the fluid return passage 62b for low pressure circulation through the unit between the discharge and fluid-receiving sections of the constant delivery source.

Figure 8:
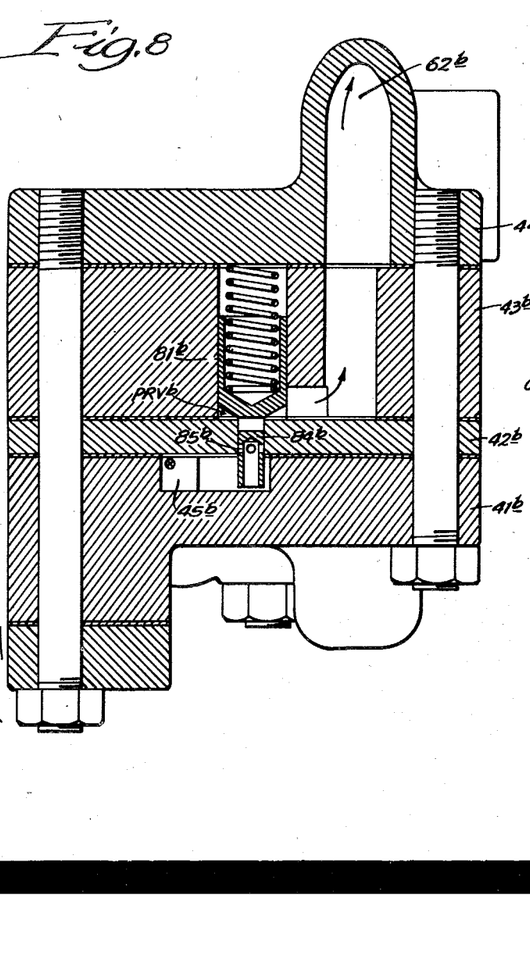

Excessive pressure within the apparatus is prevented by the pressure relief valve PRVb, Figs. 4 and 8. In Fig. 8, it is ascertainable that upon the occurrence of a predetermined maximum pressure within the fluid delivery passage 45b, this pressure will be imposed upwardly upon the portion 84b of the axial movable member 81b of said pressure relief valve, for lifting the holes 85b above the valve seat plate 42b for by-passing from the passage 45b directly into the fluid return passage 62b for delivery to the reservoir.

While only a limited number of embodiments have herein been shown and described, it should be understood that the invention extends to other embodiments, forms, modifications, structures and details falling within the scope and spirit thereof and not sacrificing all of its material advantages.

What is claimed is:

1. In an apparatus operable to control delivery of fluid from a constant delivery source having fluid receiving and fluid discharge sections, a fluid delivery passage communicative between said source discharge section and a place for fluid delivery, a check valve in said passage, a fluid return passage communicative with said source receiving section, a by-pass passage communicative between the source discharge section and said return passage, a by-pass valve in the by-pass passage, pressure-responsive valve-controlling means operable to cause the by-pass valve to be open when such valve-controlling means is subjected to pressure in one range and to cause such valve to be closed when subjected to pressure in another range, a pressure transfer passage communicative with the fluid delivery passage at a point between the check valve and said source discharge section to impose such pressures on said valve-controlling means by means of fluid from said source, and means for effecting controlled diversion of fluid from the pressure transfer passage to selectively establish said pressures.

2. In an apparatus operable to control delivery of fluid from a constant delivery source having fluid receiving and fluid discharge sections, a fluid delivery passage communicative between said source discharge section and a place for fluid delivery, a check valve in said passage, a fluid return passage communicative with said source receiving section, a by-pass passage communicative between the source discharge section and said return passage independently of said check valve, a by-pass valve in the by-pass passage, pressure - responsive valve - controlling means operable to cause the by-pass valve to be open when such valve-controlling means is subjected to the pressure of fluid in the fluid delivery passage and operable to cause said by-pass valve to be closed when subjected to a diminished pressure, a pressure transfer passage communicating between the fluid delivery passage and the valve-controlling means for subjecting the latter to the fluid delivery passage pressure, a control passage communicating with the transfer passage to divert fluid therefrom for diminishing the pressure on said valve-controlling means to cause closing of the by-pass valve, and control valve means operable to selectively open and close said control passage.

3. In an apparatus operable to control delivery of fluid from a constant delivery source having fluid receiving and fluid discharge sections, a fluid delivery passage communicative between the source discharge section and a place for fluid delivery, a fluid return passage communicative with the source receiving section, a by-pass passage communicative between the source discharge section and the return passage, a normally closed valve in the delivery passage, a by-pass valve in the by-pass passage, pressure-responsive valve-controlling means operable to cause the by-pass valve to be open when such valve controlling means is subjected to a low pressure condition of fluid in the fluid delivery passage pursuant to discharge of fluid through the by-pass passage and operable to cause said valve to be closed when subjected to a diminished pressure, a pressure transfer passage communicating between the fluid delivery passage and the valve-controlling means for subjecting the latter to fluid delivery passage pressure, a control passage communicating with the transfer passage to divert fluid therefrom for diminishing the pressure on said valve controlling means to cause closing of the by-pass valve, a control valve closable and openable for respectively closing and opening said control passage, and valve-operating means operable to selectively cause substantially concurrent opening and concurrent closing of said control valve and said normally closed valve.

4. In an apparatus operable to control delivery of fluid from a constant delivery source having fluid receiving and fluid discharge sections, a fluid delivery passage communicative between the source discharge section and a place for fluid delivery, a fluid return passage communicative with the source receiving section, a by-pass passage communicative between the source discharge section and the return passage and having a by-pass valve seat, a normally closed valve in the delivery passage, a check valve in the fluid delivery passage between the by-pass passage and said normally closed valve, a by-pass valve element in the by-pass passage and seatable in a downstream direction in such passage upon said seat wherefore the pressure of fluid on the upstream side of such valve element exerts a closing force thereon, pressure-responsive valve-controlling means operable to exert a force on the by-pass valve element in an upstream direction of a magnitude to prevail over said closing force and thereby cause the by-pass valve to be open when such controlling means is subjected to fluid pressure of an upper proportional value of the fluid pressure in the delivery passage, and such valve-controlling means being capable of exerting less force than said closing force and to be prevailed over thereby to cause closing of the by-pass valve when such operating means is subjected to fluid pressure of a lower proportional value of the pressure in the delivery passage a pressure transfer passage communicating between the fluid delivery passage and the valve-controlling means for subjecting the latter to said pressure of the upper proportional value, a control passage communicating with the transfer passage to divert fluid therefrom for diminishing the pressure on said valve-controlling means to the lower proportional value and cause closing of the by-pass valve, a control valve closable and openable for respectively closing and opening said control passage, and valve-operating means operable to selectively cause concurrent opening and concurrent closing of said control valve and said normally closed valve.

5. In an apparatus operable to control delivery of fluid from a constant delivery source having fluid receiving and fluid discharge sections, a fluid delivery passage communicative between the source discharge section and a place for fluid delivery, a fluid return passage communicative with the source receiving section, a by-pass passage communicative between the source discharge section and the return passage, a normally closed valve in the delivery passage, a by-pass valve in the by-pass passage, pressure-responsive valve-controlling means operable to cause the by-pass valve to be open when such operable means is subjected to pressure in one range and to cause such valve to be closed when subjected to pressure in another range, a pressure transfer passage in communication between the fluid delivery passage and the valve-controlling means to impose such pressures on said valve controlling means by means of fluid from said source, a control valve settable for effecting controlled diversion of fluid from the pressure transfer passage to selectively establish said pressures, and valve operating means operable to open said normally closed valve while concurrently setting the control valve to establish the closed condition of the by-pass valve and alternatively operable to close the normally closed valve while concurrently setting the control valve to establish the open condition of the by-pass valve.

6. In an apparatus operable to control delivery of fluid from a fluid discharge section of a constant delivery source to an inlet of a fluid-driven motor and from a fluid outlet of said motor to a fluid receiving section of said source, a fluid delivery passage communicative between the source discharge section and the motor inlet, a normally closed valve in said passage, a fluid return passage communicative between the motor outlet and the source receiving section, a second normally closed valve in said return passage, a by-pass passage communicative between the discharge and receiving sections of the source, a by-pass valve in the by-pass passage, pressure-responsive valve-controlling means operable to cause the by-pass valve to incur an open condition when such controlling means is subjected to pressure in one range and to cause such valve to incur a closed condition when the valve controlling means is subjected to pressure in another range, a pressure transfer passage in communication between said delivery passage and the valve-controlling means to impose such pressures on the valve-controlling means by means of fluid from the source discharge section, a control valve settable for effecting controlled diversion of fluid from said transfer passage to selectively establish said pressures, and valve operating means operable to open both of said normally closed valves while concurrently setting the control valve to establish the closed condition of the by-pass valve and alternatively operable to close the normally closed valves while concurrently setting the control valve to establish the open condition of the by-pass valve.

7. In an apparatus for controlling the delivery of fluid from a constant delivery source to a place of discharge, a fluid by-pass passage connected between discharge and return sections of said source, a fluid delivery passage between the discharge section of the source and the place of discharge, an admittance valve in such passage, a by-pass valve in said by-pass passage, valve controlling means operable to cause the by-pass valve to incur an open condition when such controlling means is subjected to a dominant pressure imposable by fluid at the pressure by-passed from the source discharge section and said controlling means being operable to incur a closed condition of the by-pass valve when subjected to a diminished pressure, a pressure transfer passage receivable of fluid from the source discharge section to impose said dominant pressure on the valve controlling means by means of said fluid, a control passage through which fluid is divertable from the transfer passage to incur said diminished pressure, a control valve in the control passage, and means for opening said control valve pursuant to opening the admittance valve and for closing the control valve pursuant to closing the admittance valve.

8. In an apparatus for controlling the delivery of fluid from a constant delivery source to a place of discharge, a fluid by-pass passage connected between discharge and return sections of said source, a fluid delivery passage between the discharge section of the source and the place of discharge, an admittance valve in such passage, a by-pass valve in the by-pass passage, valve controlling means operable to cause the by-pass valve to incur an open condition when such controlling means is subjected to a dominant pressure imposable by fluid at the pressure by-passed from the source discharge section and said controlling means being operable to incur a closed condition of the by-pass valve when subjected to a diminished pressure, a pressure transfer passage of restricted flow capacity receivable of fluid from the source discharge section to impose said dominant pressure on the valve controlling means by means of said fluid, a control passage of greater flow capacity than said transfer passage and through which fluid is withdrawable from the transfer passage to incur the said diminished pressure, a control valve in the control passage, and means for opening said control valve pursuant to opening the admittance valve and for closing the control valve pursuant to closing the admittance valve.

9. In an apparatus for controlling the delivery of fluid from a constant delivery source having fluid discharge and return sections to a drivable motor, a fluid delivery passage for connection between the source discharge section and the motor, a fluid return passage for connection between the motor and the source return section, a by-pass passage communicative between said delivery and return passages, a by-pass valve in the by-pass passage, valve controlling means operable to cause the by-pass valve to incur an open condition when such controlling means is subjected to a dominant pressure imposable by the pressure of fluid from the source discharge section and said controlling means being operable to incur a closed condition of the by-pass valve when subjected to a diminished pressure, a pressure transfer passage of limited flow capacity communicating between the fluid delivery passage and the valve controlling means to impose said dominant pressure on the latter, and a control passage of a flow capacity exceeding that of the transfer passage and through which fluid is withdrawable from the transfer passage to incur said diminished pressure.

10. In a fluid pressure control apparatus employable between a constant delivery source of motor-propelling fluid and a fluid-driven motor to be periodically driven when subjected to fluid from said source at high pressure, a fluid delivery passage communicative between said source and the motor to subject the latter to said fluid, a by-pass passage communicative with said source and effective when open to divert the fluid output of the source away from the motor at a relatively low pressure, a by-pass valve in the by-pass passage and openable and closable to respectively open and close such passage, valve operating means operable to maintain the by-pass valve open when subjected to a nominal pressure not necessarily exceeding that of fluid by-passing through the by-pass passage, a transfer passage communicative between said source and said valve operating means to impress such nominal pressure thereon, a control passage communicative with said transfer passage for withdrawing fluid therefrom to diminish such nominal pressure to cause closing of the by-pass valve, and a control valve in said control passage and including a member seatable to close the control passage and unseatable against the force of said nominal pressure to open said control passage.

11. In a fluid pressure control apparatus employable between a constant delivery source of motor-propelling fluid and a plurality of fluid-driven motors to be selectively subjected to fluid from said source at high pressure for sole and concurrent operation, fluid delivery passage means communicative between said source and the motors, admittance valve means in said passage means and settable to control communication of said passage means with the motors to selectively subject them to said fluid, a by-pass passage communicative with said source and effective when open to divert the fluid output of the source away from the motors at a relatively low pressure, a by-pass valve in the by-pass passage and openable and closable to respectively open and close such passage, valve operating means operable to maintain the by-pass valve open when subjected to a nominal pressure constituting a function of the fluid by-passing through the by-pass passage, a transfer passage communicative between said source and said valve operating means to impress such nominal pressure thereon, a control passage communicative with the transfer passage for withdrawing fluid therefrom to diminish such nominal pressure to cause closing of the by-pass valve, a plurality of control valves respectively associated with said motors and each including a valve member seatable to preclude the escape of fluid therepast from the control passage and unseatable against the force of said nominal pressure to open said control passage, and means for unseating said control valve members pursuant to setting the admittance valve means for subjecting their respective motors to fluid from the source, and the flow capacity of said control passage past each of the unseated control valve members exceeding the flow capacity of said transfer passage to preclude the creation in the control passage of a pressure inordinately exceeding said nominal pressure, while the by-pass valve is closed in response to the unseating of any of the unseatable control valve members, so there will be no substantial resistance by the pressure of fluid in the control passage to the subsequent unseating of selected other of the unseatable members.

12. In an apparatus operable to control delivery of fluid from a constant delivery source having fluid receiving and fluid discharge sections, a fluid delivery passage communicative between the source discharge section and a place for fluid delivery, a fluid return passage communicative with the source receiving section, a by-pass passage communicative between the source discharge section and the return passage, a normally closed valve in the delivery passage, a by-pass valve in the by-pass passage, pressure-responsive valve-controlling means operable to cause the by-pass valve to be open when such valve-controlling means is subjected to fluid pressures of an upper proportional value of the fluid pressure in the delivery passage and to cause said valve to be closed when such valve controlling means is subjected to pressures of a lower proportional value of that in the delivery passage, a pressure transfer passage communicating between the delivery passage and the valve-controlling means for subjecting the latter to pressure of the upper proportional value, a control passage communicating with the transfer passage to divert fluid therefrom for diminishing the pressure of upper proportional value to a lower proportional value to cause closing of the by-pass valve, a control valve closable and openable for respectively closing and opening said control passage, and valve operating means operable to selectively cause substantially concurrent opening and concurrent closing of said control valve and said normally closed valve.

13. In apparatus for the control of a motor drivable by propelling fluid received from a source including a pressure regulating device operable in response to a reduction in fluid pressure imposed upon a regulating part thereof to convert said source from a by-pass condition to a delivery condition in which it is operable to supply fluid at high pressure for driving the motor, a delivery conduit for conducting fluid from said source to the motor, an exhaust conduit for conducting fluid from the motor, a control conduit communicative between said exhaust conduit and said regulating part to divert pressure-imposing fluid therefrom, an admittance valve in the delivery conduit, an exhaust valve in the exhaust conduit, a control valve in the control conduit, and valve operating means selectively operable to concurrently open said valves and to concurrently close said valves.

14. In apparatus for the control of a motor comprising a chamber into opposite ends of which fluid is alternately admitted and exhausted to propel a work member therein in opposite directions and receivable of such fluid from a source including a pressure-regulating device operable in response to changes of fluid pressure imposed on a regulating part thereof to place the source in a fluid by-pass condition or in a delivery condition in which it is operable to supply fluid at high pressure for driving the motor, delivery conduit means for conducting propelling fluid from said source to each end of the motor chamber, separate exhaust conduit means communicative with each end of the motor chamber, transfer conduit means communicative between the delivery conduit means and said regulating part for delivery of pressure-imposing fluid thereto, control conduit means communicative with said regulating part to divert said pressure-imposing fluid therefrom, admittance valve means operable in the delivery conduit means and manipulatable to preclude communication of such conduit means with both ends of the motor chamber or to provide communication with either end, exhaust valve means operable in the exhaust conduit means and manipulatable to preclude communication of such conduit means with both ends of the motor chamber or to provide communication with either end, control valve means operable in the control conduit means to control the diversion of fluid through such conduit means to establish either the by-pass condition or the pressure delivery condition of said source, and means for coordinately operating all of said valve means to selectively establish communication between the delivery conduit means and either end of the motor chamber while establishing communication between the exhaust conduit means and the other end of said chamber and concurrently operating the control valve means to establish the pressure delivery condition of said source.

15. The combination set forth in claim 14, wherein said valve means are in groups of which one group includes an admittance valve settable to provide or preclude communication between the delivery conduit means and one end of the motor chamber, an exhaust valve settable to provide or preclude communication between the exhaust conduit means and the other end of said chamber and a control valve settable to cause or preclude diversion of fluid from the control conduit means, of which the other group includes an admittance valve settable to provide or preclude communication between the delivery conduit means and the other end of the motor chamber, an exhaust valve settable to provide or preclude communication between the exhaust conduit means and said one end of said chamber and a control valve settable to cause or preclude diversion of fluid from the control conduit means, and wherein said coordinately operating means includes a rockable valve control member displaceable in one direction to set the one group of valves for providing their aforesaid communication and diversion while the valves in the other group are set to preclude their respective communication and diversion, and said member being displaceable in the opposite direction to set the other group of valves for providing their aforesaid communication and diversion while the valves in the one group are set to preclude their respective communication and diversion.

16. The combination set forth in claim 14, wherein said valve means includes two groups of valves within the wall of the motor chamber, and each group includes an admittance valve openable and closable to provide or preclude communication between the delivery conduit means and respective ends of the motor chamber, an exhaust valve openable and closable to provide or preclude communication between the exhaust conduit means and respective opposite ends of said chamber and a control valve openable and closable to provide or preclude diversion of fluid through said control conduit means, and a rockable control member on the motor, rockable in one direction to open the valves in one of said group of valves and rockable in the opposite direction to open the valves in the other group.

CARL W. MOTT.

REFERENCES CITED

The following references are of record in the file of this patent:

UNITED STATES PATENTS

| Number | Name | Date |
|---|---|---|
| 727,039 | Westinghouse | May 5, 1903 |
| 1,955,154 | Temple | Apr. 17, 1934 |
| 1,989,387 | Vickers | Jan. 29, 1935 |
| 2,057,088 | De Millar | Oct. 13, 1936 |
| 2,172,901 | Brownstein | Sept. 12, 1939 |
| 2,247,140 | Twyman | June 24, 1941 |
| 2,316,445 | Marshall | Apr. 13, 1943 |
| 2,362,713 | Mott | Nov. 14, 1944 |
| 2,363,235 | Ellinwood | Nov. 21, 1944 |
| 2,377,278 | Stephens | May 29, 1945 |